United States Patent
Booker et al.

(10) Patent No.: US 7,488,257 B1
(45) Date of Patent: Feb. 10, 2009

(54) MULTIPLE-TUBE PROPELLER SHAFT ASSEMBLY

(75) Inventors: Danny Lee Booker, Oakland Township, MI (US); Robert Genway-Haden, Rochester Hills, MI (US); James Lyon, Northampton (GB)

(73) Assignee: GKN Driveline North America, Inc., Auburn Hills, MI (US)

( * ) Notice: Subject to any disclaimer, the term of this patent is extended or adjusted under 35 U.S.C. 154(b) by 282 days.

(21) Appl. No.: 11/179,897

(22) Filed: Jul. 12, 2005

(51) Int. Cl.
*F16D 3/06* (2006.01)
(52) U.S. Cl. .................................. 464/162; 403/359.1
(58) Field of Classification Search ................. 464/162, 464/183; 280/777; 403/359.1–359.6
See application file for complete search history.

(56) References Cited

U.S. PATENT DOCUMENTS 3,990,013 A * 11/1976 Badger
4,552,544 A * 11/1985 Beckman et al. ............ 464/162
5,342,091 A * 8/1994 Hancock ...................... 280/777
5,580,314 A * 12/1996 Moriyama et al. .......... 464/162

* cited by examiner

*Primary Examiner*—Greg Binda
(74) *Attorney, Agent, or Firm*—Jennifer M. Brumbaugh; Mick A. Nylander

(57) ABSTRACT

A multiple-tube propeller shaft assembly includes a first tube with a plurality of splines defining a splined portion, a second tube with a plurality of splines defining a splined portion, and a third tube with a plurality of splines defining a splined portion. In an embodiment, one end of the third tube is telescopically received within the first tube in a slip tube spline connection, while the other end is received within the second tube in a locked tube spline connection. In another embodiment, the first tube is telescopically received in one end of the third tube in a slip tube spline connection, while the second tube is received in the other end of the third tube in a locked tube spline connection. The propeller shaft assembly can be tuned to absorb crash energy between 0 and 50 kN.

14 Claims, 7 Drawing Sheets

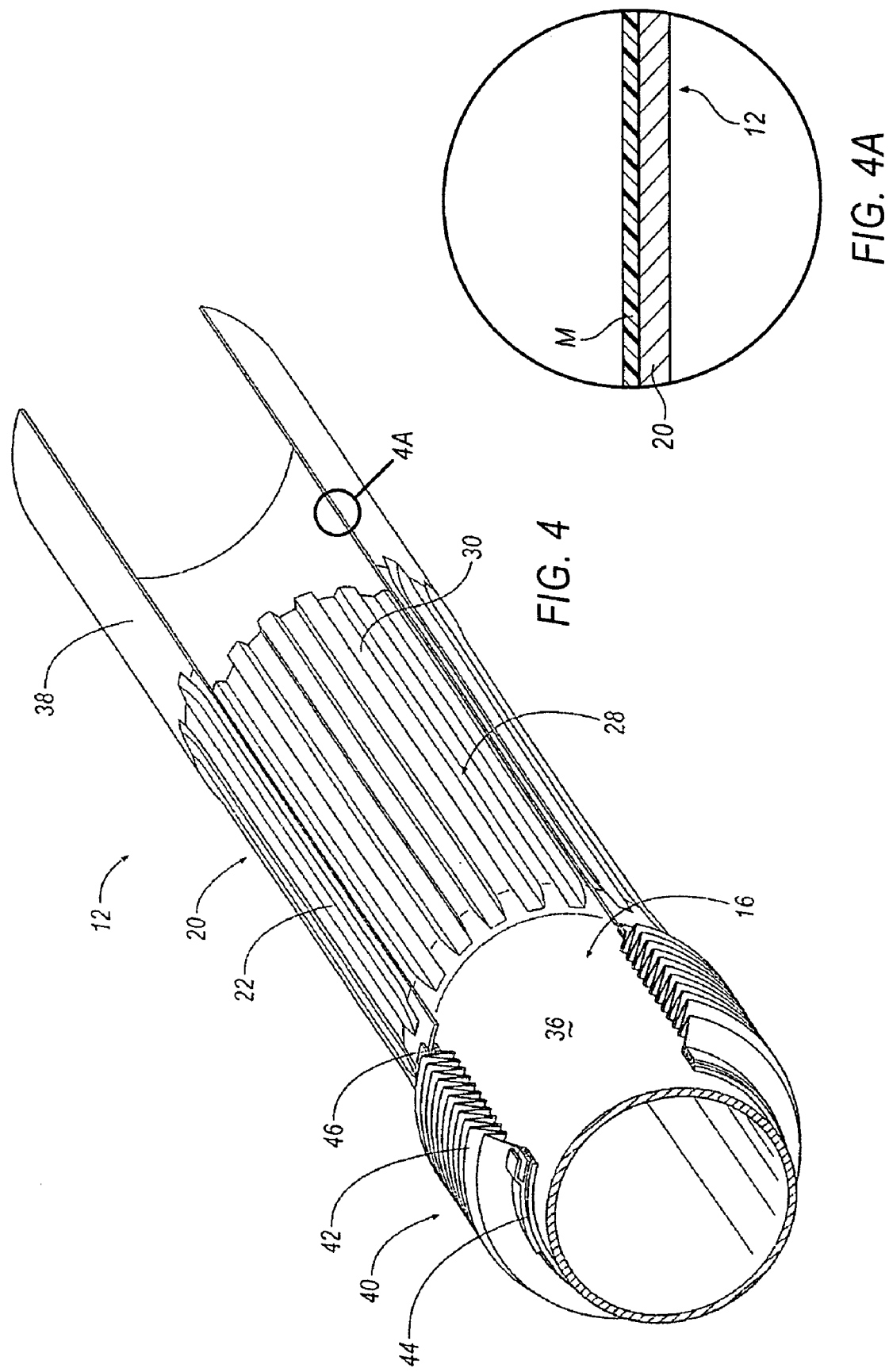

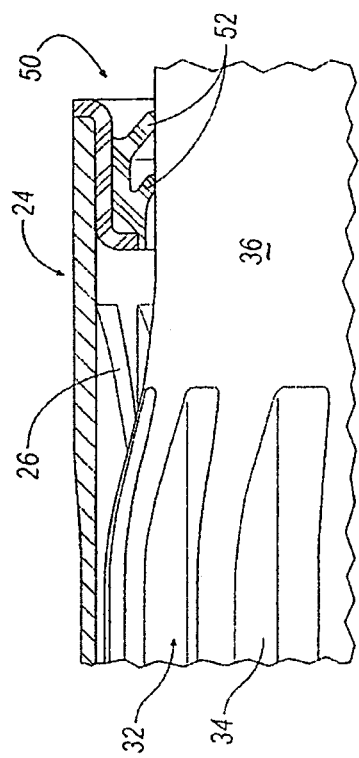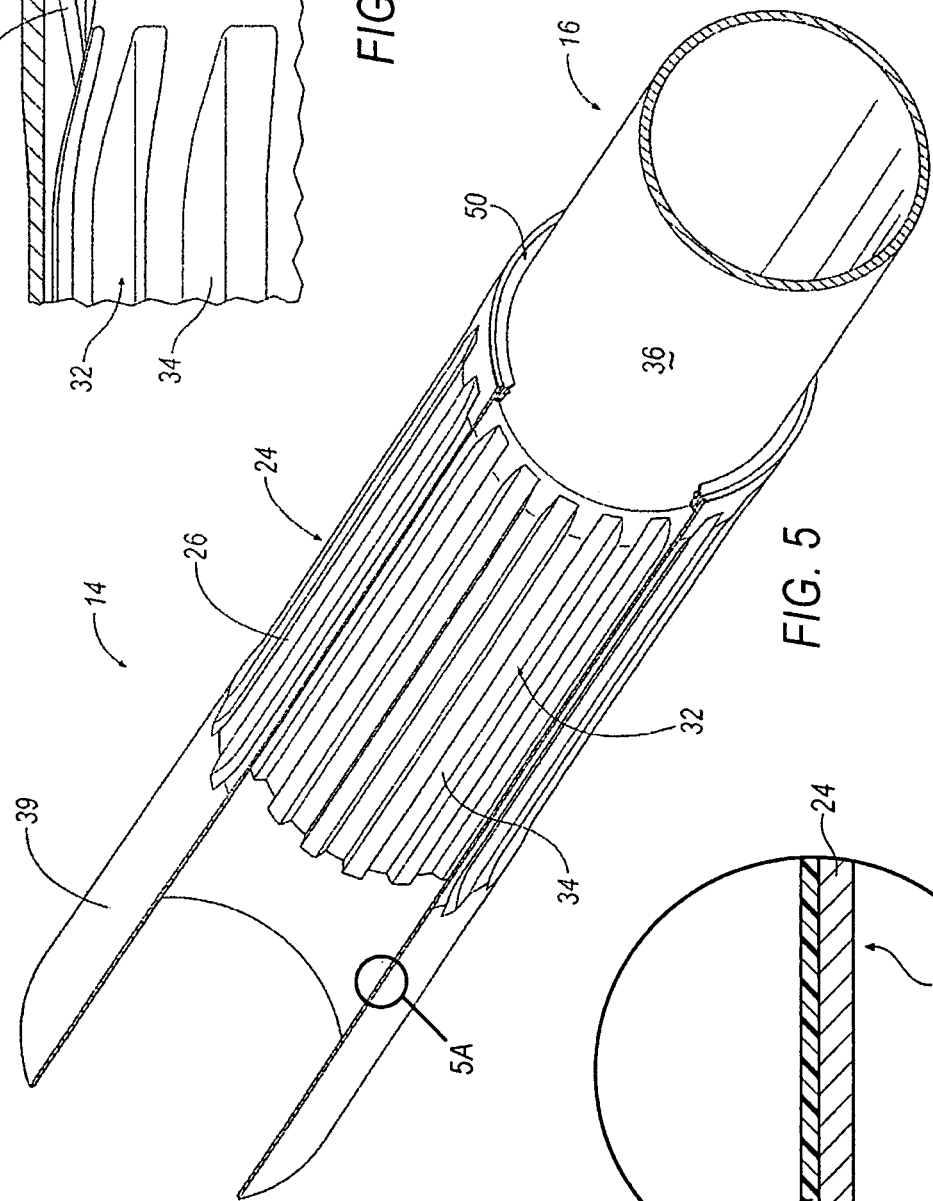

MULTIPLE-TUBE PROPELLER SHAFT ASSEMBLY

FIELD OF THE INVENTION

The invention relates in general to a propeller shaft assembly for a vehicle, and more particularly to a multiple-tube propeller shaft assembly having an optimized energy absorption feature that can be tuned to give the exact level(s) of force required at the moment(s) in time to positively affect the vehicle crash signature.

BACKGROUND OF THE INVENTION

In a rear wheel drive vehicle, for example, a vehicle driveshaft or propeller shaft transmits torque from the transmission through a differential to the rear wheels of the vehicle, thereby causing the vehicle wheels to be desirably and selectively turned. The propeller shaft also dynamically compensates for the change or modification in the distance between the transmission and the differential that may occur when the vehicle is driven. Hence, the propeller shaft includes a portion or a member, which typically and telescopingly moves along the longitudinal axis of the propeller shaft in response to relative movement between the differential and the transmission, thereby allowing the propeller shaft to dynamically modify its length in response to the movement of the vehicle.

This dynamic length modification is typically achieved by the use of a pair of splined members that are normally manufactured of a relatively heavy material, such as conventional and commercially available iron, and which are respectively and commonly referred to as the "slip yoke" and the "yoke shaft." Particularly, the yoke shaft is selectively inserted into the slip yoke and is movably coupled to the transmission. The slip yoke is typically coupled to the differential and the respective splines of these members (which are typically broached or "machined" onto the yoke members) intermeshingly cooperate to allow and/or to cause the yoke shaft to rotate the slip yoke in response to the rotation of the transmission, thereby allowing the transmission produced torque to be selectively coupled to the differential by the rotation of the slip yoke. The intermeshed splines also allow the yoke shaft to be movable along the longitudinal axis of the propeller shaft, thereby allowing the propeller shaft to dynamically compensate for changes in the distance between the transmission and the differential and allowing the propeller shaft to desirably operate when the vehicle is driven.

During a frontal crash, energy is imparted upon the vehicle and deforms the components in a longitudinal manner. Typically, the engine and transmission are driven rearward in a frontal crash, causing the propeller shaft to buckle during such an impact. This buckling of the propeller shaft may cause extensive damage to adjacent underbody components, or may even penetrate the passenger compartment. In addition, the dynamic length modification achieved by the use of a pair of splined members is limited to a finite length. Thus, it would be desirable to provide a propeller shaft assembly having a tunable energy absorption characteristic and can extend the dynamic length modification of the propeller shaft assembly.

SUMMARY OF THE INVENTION

To solve these and other problems associated with conventional propeller shaft assemblies, a multiple-tube propeller shaft assembly comprises a first inner tube having an outer surface with a splined portion, a second inner tube having an outer surface with a splined portion, and an outer tube having an inner surface with a splined portion for interconnecting the first and second inner tubes. The splined portion of one of the first and second inner tubes is capable of slidably engaging the splined portion at one end of the outer tube to form a slip spline connection therebetween, and the splined portion of the other one of the first and second inner tubes is capable of lockingly engaging the splined portion at the other end of the outer tube to form a locked spline connection therebetween.

In another aspect of the invention, a multiple-tube propeller shaft assembly comprises a first outer tube having an inner surface with a splined portion, a second outer tube having an inner surface with a splined portion, and an inner tube having an exterior surface with a splined portion for interconnecting the first and second outer tubes. The splined portion of one of the first and second outer tubes is capable of slidably engaging the splined portion at one end of the inner tube to form a slip spline connection therebetween. The splined portion of the other one of the first and second outer tubes is capable of lockingly engaging the splined portion at the other end of the inner tube to form a locked spline connection therebetween.

In another aspect of the invention, a multiple-tube propeller shaft assembly comprises a first tube with a plurality of splines defining a splined portion, a second tube with a plurality of splines defining a splined portion, and a third tube with a plurality of splines defining a splined portion. One end of the third tube forms a slip tube spline connection with the splined portion of the first tube, and the other end of the third tube forms a locked tube spline connection with the splined portion of the second tube.

BRIEF DESCRIPTION OF THE DRAWINGS

In the drawings:

FIG. 4 shows a partial cutaway perspective view of a slip spline connection of the multiple-tube propeller shaft assembly of FIG. 1.

FIG. 4A is an enlarged, partial cross sectional view of a portion of the shaft as seen in FIG. 4; where relative thickness is not shown to scale.

FIG. 5 shows another partial cutaway perspective view of a locked spline connection of the multiple-tube propeller shaft assembly of FIG. 1.

FIG. 5A is an enlarged, partial cross sectional view of a portion of the shaft as seen in FIG. 5; where relative thickness is not shown to scale.

FIG. 6 shows a cross-sectional view of the locked spline connection of the multiple-tube propeller shaft assembly taken along line 5-5 of FIG. 3.

DETAILED DESCRIPTION

In general, a multiple-tube propeller shaft assembly comprises a first tube with a plurality of splines defining a splined portion, a second tube with a plurality of splines defining a splined portion, and a third tube with a plurality of splines defining a splined portion. One end of the third tube forms a slip tube spline connection with the splined portion of the first tube, and the other end of the third tube forms a locked tube spline connection with the splined portion of the second tube. The propeller shaft assembly can be tuned to absorb crash energy between 0 and 50 kN, while increasing stiffness when compared to conventional driveshaft assemblies.

Figure 1:
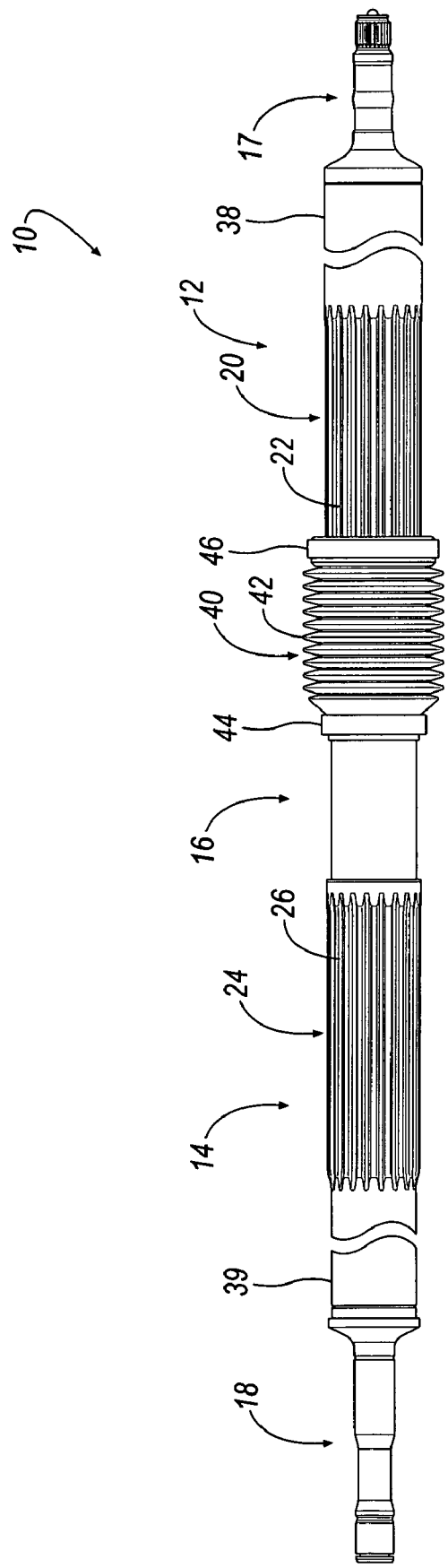
FIG. 1 shows a side view of a multiple-tube propeller shaft assembly according to an embodiment of the invention.

Referring now to FIG. 1, a multiple-tube propeller shaft assembly 10 is shown according to an embodiment of the invention. In the illustrated embodiment, the propeller shaft assembly 10 includes a first outer tube 12, a second outer tube 14, and an inner tube 16 interconnecting the first and second outer tubes 12, 14. A stub shaft 17 can be fixedly attached to one end of the first outer tube 12, and a stub shaft 18 can be fixedly attached to one end of the second outer tube 14. Alternatively, one or both of the stub shafts 17, 18 can be replaced with a conventional flange or yoke. Preferably, the tubes 12, 14, 16 are formed from cylindrical tubes and can be manufactured from any suitable conventional materials, such as commercially available low carbon alloy steel, lightweight aluminum, or the like.

In the illustrated embodiment, the multiple-tube propeller shaft assembly 10 comprises three tubes 12, 14 and 16. However, it will be appreciated that the invention is not limited by the number of tubes, and that the invention can be practiced with more than three tubes.

Figure 2:
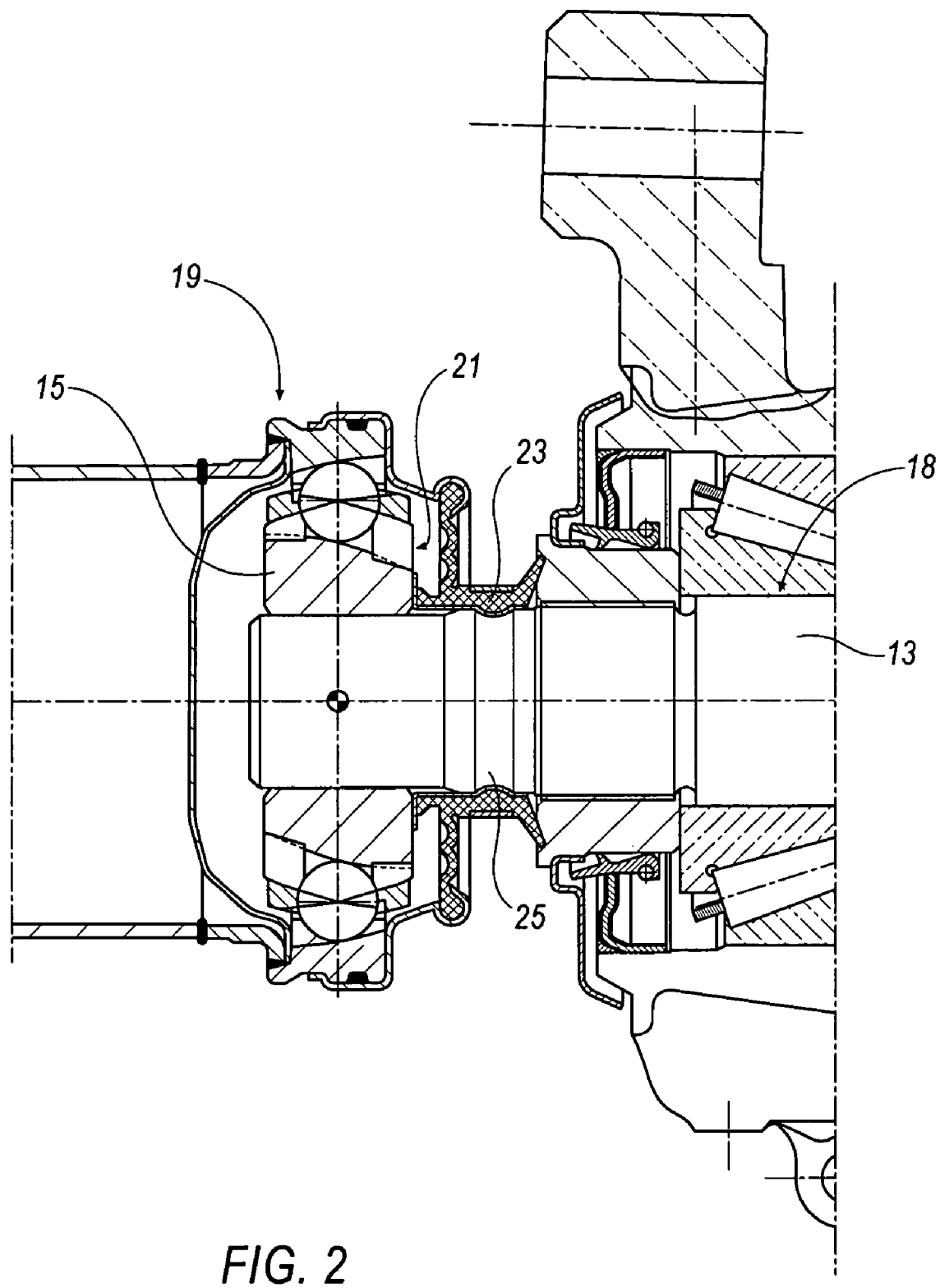
FIG. 2 shows a cross sectional view of a Direct Torque Flow (DTF) arrangement of the multiple-tube propeller shaft assembly of FIG. 1.

In another embodiment, one or both of the stub shafts 17, 18 can be coupled to a universal joint 19 (or a constant velocity joint) using a Direct Torque Flow (DTF) arrangement, as shown in FIG. 2. In this type of arrangement, a shaft journal 13 of the stub shaft 18, for example, is rotatably supported by an inner joint part 15 of an inner race 21 of the universal joint 19 is contemplated by the present invention. A securing sleeve 23 is firmly connected to the inner joint part 15 by an annular groove 25 on the shaft journal 13. However, any form of connection of the stub shafts 17, 18 to the inner joint part 15 is contemplated by the present invention.

In the illustrated embodiment of FIG. 1, the first outer tube 12 includes a splined portion 20 with a plurality of inwardly projecting splines 22 that are circumferentially formed on the interior surface of the first outer tube 12. The splined portion 20 substantially extends from one end of the first outer tube 12 to an unsplined portion 38 that is preferably swaged to reduce the diameter thereof to fit the stub shaft 17. Alternatively, the unsplined portion 38 may be swaged to reduce the diameter thereof to form the shaft journal 13 in one of the stub shafts 17, 18 to be used in the DTF arrangement described above. Similarly, the second outer tube 14 includes a splined portion 24 with a plurality of inwardly projecting splines 26 that are circumferentially formed on the interior surface of the second outer tube 14. The splined portion 24 extends from one end of the second outer tube 14 to an unsplined portion 39 that is preferably swaged to reduce the diameter thereof to fit the stub shaft 18. Alternatively, the unsplined portion 39 may be swaged to reduce the diameter thereof to form the sleeve to be used in the DTF arrangement. Thus, one end of the first outer tube 12 is reduced to a size for attachment to a conventional differential (not shown) as is well known to one skilled in the art. Likewise, one end of the second outer tube 14 is reduced to a size for attachment to a conventional transmission (not shown) as is well known to one skilled in the art.

Referring to FIGS. 3-6, the inwardly projecting splines 22, 26 of the first and second outer tubes 12, 14 form an inner diameter that is approximately equal to the outer diameter of the inner tube 16. The number of splines 22, 26 and depth thereof is application specific to ensure that the propeller shaft assembly 10 is capable of transmitting torque for the particular application. The number and configuration of the splines 22, 26 may vary depending upon a number of factors, including the torque requirements of the propeller shaft assembly 10. For example, any number of splines 22, 26 may be spaced apart around the entire perimeter of the splined portions 20, 24 or a portion thereof.

Referring specifically now to FIGS. 4 and 5, one end of the inner tube 16 includes a first splined portion 28 with a plurality of externally projecting splines 30 and the other end of the inner tube 16 includes a second splined portion 32 with a plurality of externally projecting splines 34 that are circumferentially formed on the exterior surface of the inner tube 16, with an unsplined portion 36 therebetween. The inner tube 16 is capable of being received within the first and second outer tubes 12, 14 such that the splined portions 20, 24 of the first and second inner tubes 12, 14 are adapted to selectively and cooperatively intermesh with the splined portions 28, 32 of the inner tube 16, respectively, to provide a rotational driving connection between the inner and outer tubes 12, 14, 16. In this manner, for example, the torque supplied by the transmission is communicated to the second outer tube 14 to the inner tube 16 by use of the intermeshed splined portions 20, 28, through the inner tube 16, then to the first outer tube 12 by use of the intermeshed splined portions 24, 32, and then to the differential.

In the illustrated embodiment, there are approximately twenty (20) splines 22, 26, 30, 34 formed on each tube 12, 14, 16 that have a depth of approximately 5.0 mm (0.2 inches). The depth is defined as the distance from the top of an outwardly projecting spline to the base of an adjacent inwardly projecting spline. In the illustrated embodiment, the end walls of each spline 22, 26, 30, 34 form an angle of about between forty degrees (40°) to eighty degrees (80°), for example, approximately sixty degrees (60°) to each other, although other angular configurations may be utilized. At least a portion of the splines 30, 34 of the inner tube 16 may be coated with a material having a low coefficient of friction, such as nylon or the like. Moreover, as best seen in FIG. 4A, the inner surface of the first outer tube 12 may be coated with a material M having a low coefficient of friction. FIG. 5A also illustrates the outer surface of the second outer tube 14 also coated with the material M, and as discussed, the material M may be any material with a low coefficient of friction, such as, but not limited to, nylon. The coating can be precision shaved to provide the desired clearance between the inner tube 16 and the outer tubes 12, 14. As illustrated, the splines 22, 26, 30 34 are arranged substantially parallel to the rotational axis of the propeller shaft assembly 10. Alternatively, some or all of the splines 22, 26, 30, 34 may form a spiral pattern relative to the rotational axis of the propeller shaft assembly 10. In another embodiment, the splines 22, 26, 30, 34 may have different lengths.

The splines 22, 26, 30, 34 can be formed by using any well-known process. For example, the splines 22, 26, 30, 34 can be "cold formed" by the use of the conventional "Grob" process, which his provided by the Ernst Grob AG company of Mannedorf, Switzerland. In another example, the externally projecting splines 30, 34 can be formed by deforming the splined portions 28, 32 radially inwardly, whereby the non-deformed regions on the outer tubes 12, 14 extending between such radially inwardly deformed portions constitute the externally projecting splines 30, 34. Alternatively, portions of the inner tube 16 can be expanded radially outwardly, and those radially expanded portions can constitute the externally projecting splines 30, 34. The splines 22, 26, 30, 34 can be formed in any desired manner, such as by mechanical crimping, electromagnetic pulse forming, hydroforming, and the like. As discussed below, the shape and size of the splines 22, 26, 30, 34 will determine the magnitude of the collapse force for the propeller shaft assembly 10.

Next, the outer tubes 12, 14 are disposed about the inner tube 16, preferably in a press fit relationship. Typically, the outer diameter of the inner tube 16 (as defined by the major diameter of the external splines 30, 34) are only slightly smaller than the inner diameter of the outer tubes 12, 14. After fitting the outer tubes 12, 14 telescopically over the inner tube 16 in this manner, portions of the outer tubes 12, 14 are then deformed radially inwardly about the inner tube 16. Such radially inward deformation of the outer tubes 12, 14 can be performed by any desired process, such as by mechanical crimping, electromagnetic pulse forming, hydroforming, hammering, and the like. In one embodiment, the deformation occurs using a progressive hammering technique. The radially portions of the outer tubes 12, 14 that extend between the internally projecting splines 22, 26 of the outer tubes 12, 14 define the externally projecting splines 30, 34 on the inner tube 16. Thus, the inner tube 16 is conformed around the outer tubes 12, 14, thereby forming the complementary externally projecting splines 30, 34.

Figure 3:
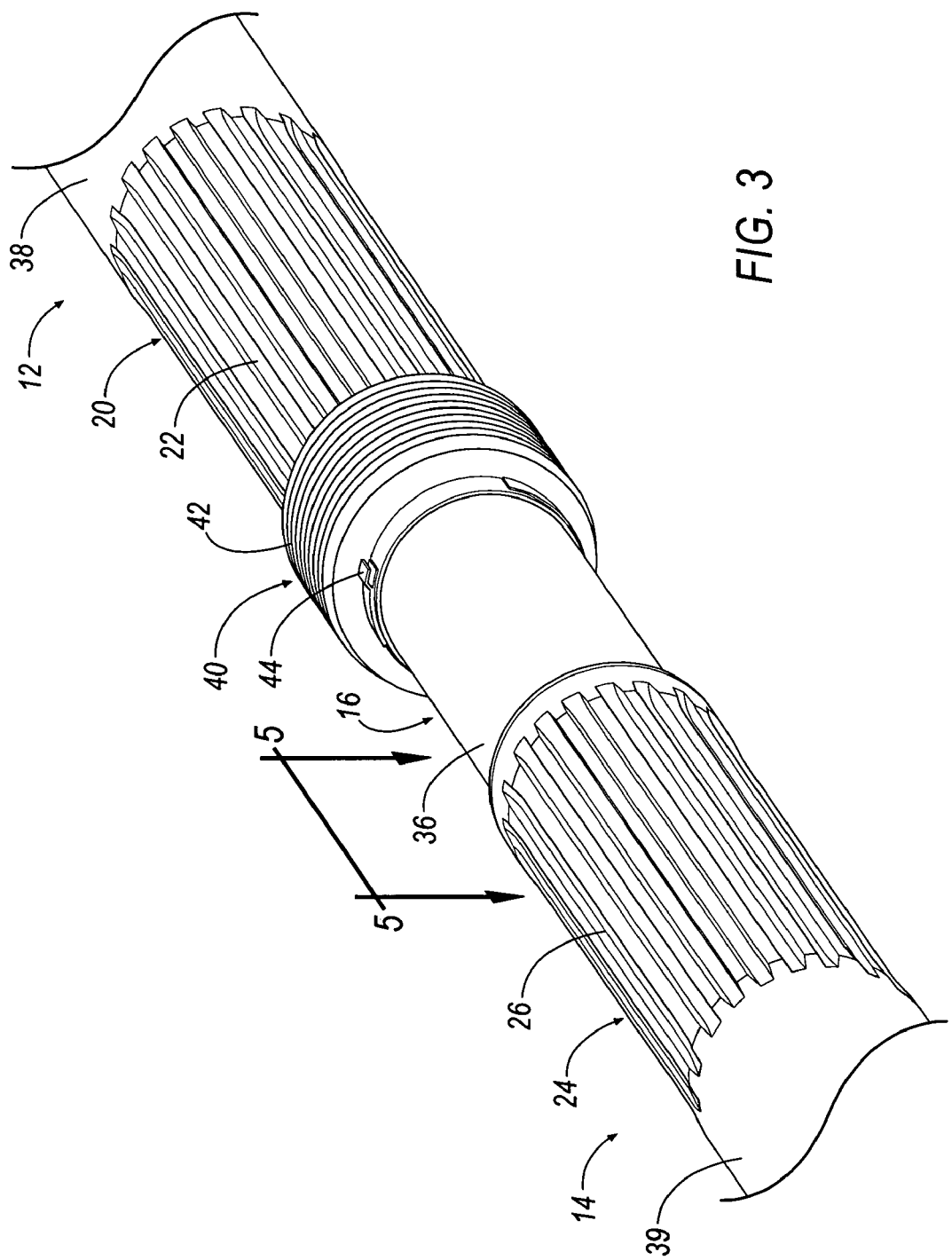
FIG. 3 shows a perspective view of the multiple-tube propeller shaft assembly of FIG. 1.

One aspect of the invention is that the inner tube 16 interconnects the first and second outer tubes 12, 14 such that the energy absorption characteristics of the propeller shaft assembly 10 can be selectively optimized or tuned for a particular crash signature curve. Specifically, in one embodiment of the invention, the splined portion 20 of the outer tube 12 dynamically moves axially along the rotational axis of the propeller shaft assembly 10 with respect to the splined portion 28 of the inner tube 16 in response to changes in the distance between the transmission and the differential in what is commonly referred to as a slip tube spline connection, as shown in FIG. 3. In this type of connection, a rubber boot member 40 having several integrally formed selectively expandable pleats 42 covers and seals the ends of the outer tube 12 and inner tube 16. In one embodiment, the boot member 40 is clamped onto the propeller shaft assembly 10 by the use of a pair of substantially identical and commercially available circular clamps 44, 46. The boot member 40 is designed to prevent external elements, such as water, dirt, or salt, from penetrating into the propeller shaft assembly 10, and in particular the splined portions 20, 28 of the propeller shaft assembly 10. At the same time, the boot member 40 compensates for extensive length changes associated with the slip tube spline connection of the propeller shaft assembly 10. In one embodiment, the boot member 40 can selectively slip or slide over the splined portions 20, 28.

In the case where the first outer tube 12 and inner tube 16 provide a slip tube spline connection, the splined portion 24 of the second outer tube 14 and the splined portion 32 of the inner tube 16 are in an interference or press fit relationship with each other in what is commonly referred to as a locked tube spline connection, as shown in FIGS. 4-6. This type of connection can be achieved by providing the internally projecting splines 26 of the second outer tube 14 with a slightly smaller inside (minor) diameter than the outside (major) diameter of the externally projecting splines 34 of the inner tube 16 such that a frictional force exists between the second outer tube 14 and the inner tube 16, or vice versa. Because of the interference fit, axial movement between the second outer tube 14 and the inner tube 16 is precluded until an axial force greater than the frictional force is applied at one of the ends of the propeller shaft assembly 10. A seal member 50 may be provided to prevent external elements, such as water, dirt, or salt, from penetrating into the propeller shaft assembly 10, and in particular the splined portions 24, 32 of the propeller shaft assembly 10. Specifically, the seal member 50 can be disposed between the inner tube 16 and the second outer tube 14. The seal member 50 includes one or more sealing lips 52 that extend an angle with respect to the inner tube 16, as shown in FIGS. 5 & 6.

As mentioned above, the slip tube spline connection between one of the outer tubes 12, 14 and the inner tube 16 allows axial movement along the rotational axis of the propeller shaft assembly 10 while the vehicle is driven. The slip tube spline connection is designed for static and/or dynamic plunge and to provide a relatively smaller crash energy absorption, as compared to the locked tube spline connection between the other one of the outer tubes 12, 14 and the inner tube 16. Specifically, the slip tube spline connection between the first outer tube 12 and the inner tube 16 can be selectively tuned for crash loads that are between 0 and 10 kN. On the other hand, the locked tube spline connection between the second outer tube 14 and the inner tube 16 is designed to provide a relatively larger crash energy absorption that can be selectively tuned for crash loads that are between 10 and 50 kN. Thus, the amount of energy absorbed during axial deformation of the propeller shaft assembly 10 can be selectively tuned between 0 and 50 kN, thereby allowing the propeller shaft assembly 10 to be selectively tuned different levels of crash energy absorption.

One skilled in the art appreciates that the diameters of the outer tubes 12, 14 and the inner tube 16 may vary depending on the vehicle application and materials used. However, in common applications, the outside diameter of the outer tubes 12, 14 may range between 2.5 and 4.0 inches where the shafts are preferably formed from a low carbon alloy steel, such as 1015 or 1026 steel. In such an embodiment, the shafts have a wall thickness of approximately 0.065 inches. A clearance between the splines 22 and the splines 30 is approximately 0.03 inches to facilitate axial movement therebetween. In an embodiment, the interference of the unsplined portion 38 of the outer tube 12 into the externally projecting splines 30 of the inner tube 16 is approximately 0.4 inches. One skilled in the art recognizes this interference is application specific, that is, dependent upon the energy dissipated, the materials selected, the size of the members, and the like.

By selectively tuning the crash loads for the slip tube spline and locked tube spline connections between the outer tubes 12, 14 and the inner tube 16, the crash signature curve of the propeller shaft assembly 10 can be optimized to reduce the probability that the propeller shaft assembly 10 will undesirably buckle in a collision.

Figure 7:
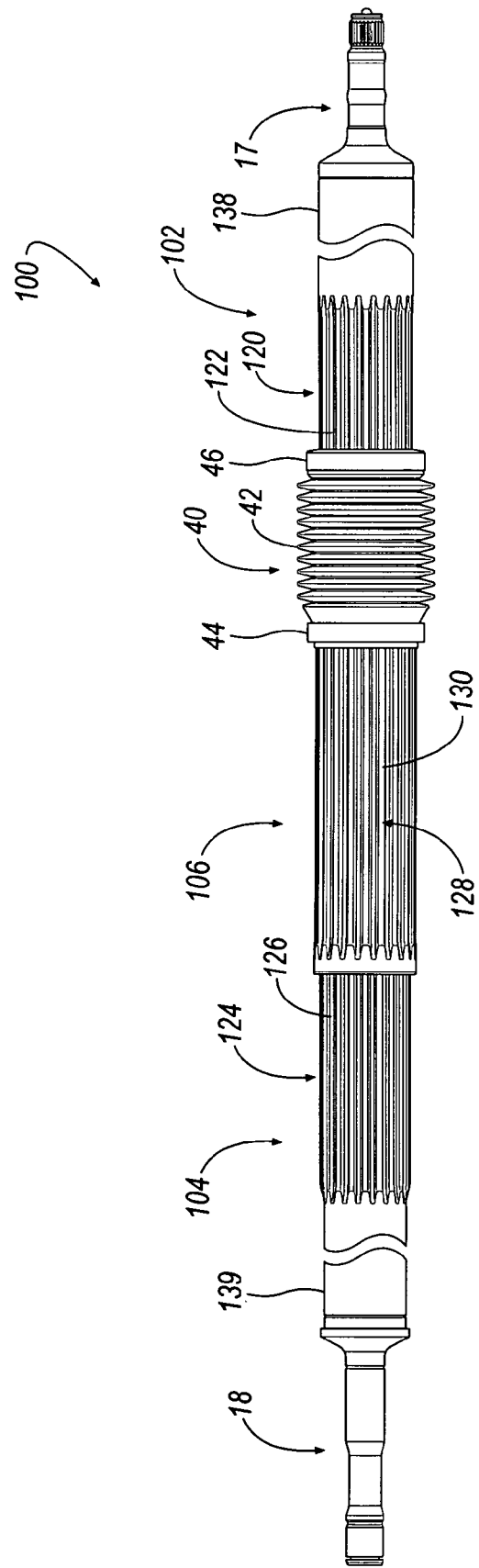
FIG. 7 shows a side view of a multiple-tube propeller shaft assembly according to an embodiment of the invention.
Figure 8:
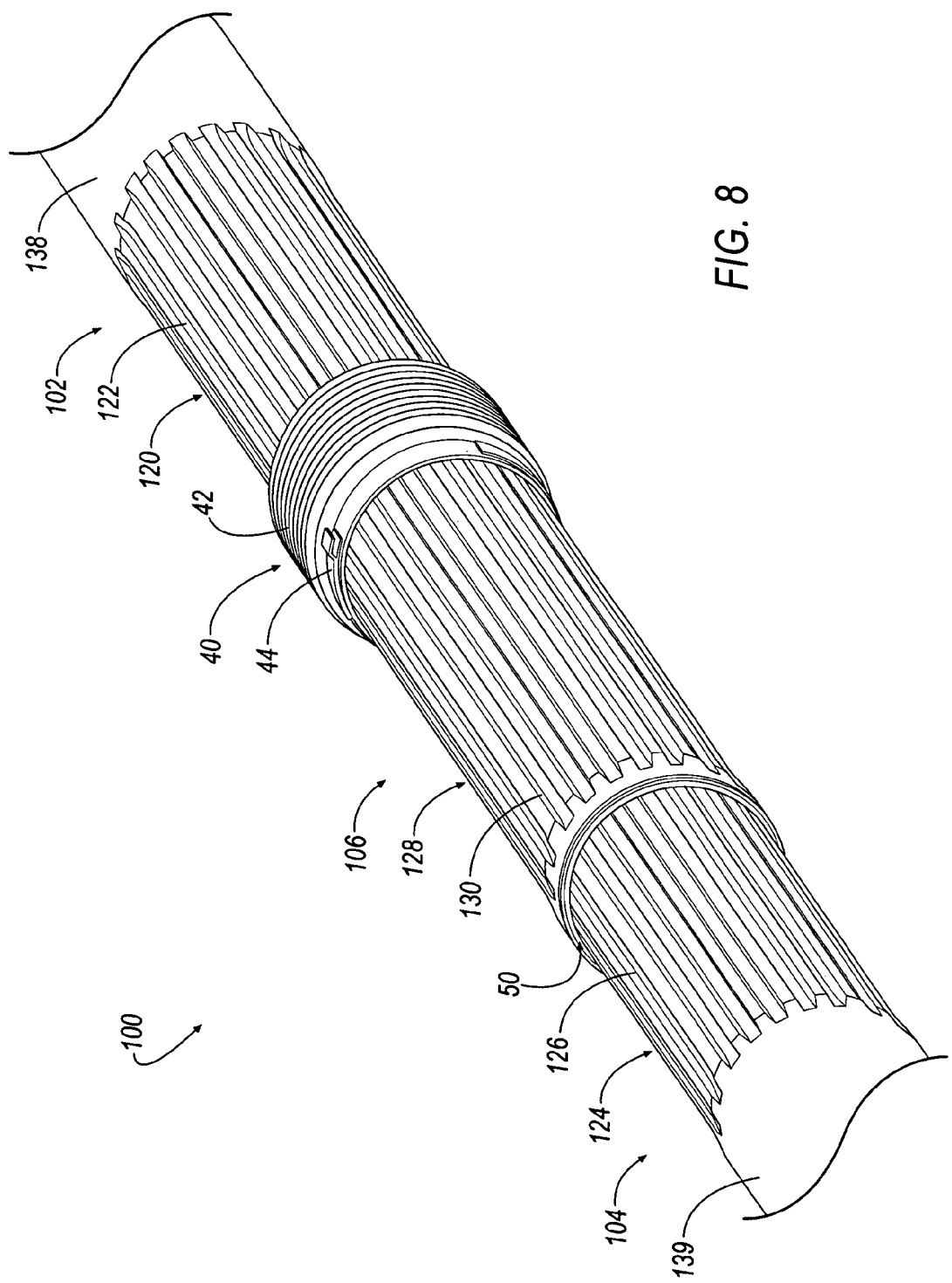
FIG. 8 shows a perspective view of the multiple-tube propeller shaft assembly of FIG. 7.

Referring now to FIGS. 7 and 8, a propeller shaft assembly 100 is shown according to another embodiment of the invention. In general, the propeller shaft assembly 100 is similar to the propeller shaft assembly 10, except that the propeller shaft assembly 100 includes a first and second inner tubes 102, 104, rather than first and second outer tubes 12, 14 as in the propeller shaft assembly 10, and an outer tube 106, rather than the inner tube 16 as in the propeller shaft assembly 10, for interconnecting the first and second inner tubes 102, 104.

In the illustrated embodiment shown in FIG. 7, the first inner tube 102 includes a splined portion 120 with a plurality of externally projecting splines 122 that are circumferentially formed on the exterior or outer surface of the first inner tube 102. The splined portion 120 extends from one end of the first inner tube 102 to an unsplined portion 138 that is preferably swaged to reduce the diameter thereof to fit the stub shaft 17. Similarly, the second inner tube 104 includes a splined portion 124 with a plurality of externally projecting splines 126 that are circumferentially formed on the exterior surface of the second inner tube 104. The outer tube 106 includes a splined portion 128 with a plurality of inwardly projecting splines 130 that are circumferentially formed on the interior or inner surface of the outer tube 106.

Referring now to FIG. 8, the first and second inner tubes 102, 104 are capable of being received within the outer tube 106 such that the splined portions 120, 124 of the first and second inner tubes 102, 104 are adapted to selectively and cooperatively intermesh with the splined portion 128 of the outer tube 106. In this manner, the torque supplied by the transmission is communicated to the second inner tube 104, through the outer tube 106, then to the first inner tube 102 by use of the intermeshed splined portions 120, 124, and then to the differential.

Similar to the propeller shaft assembly 10, the propeller shaft assembly 100 can be selectively optimized or tuned for a particular crash signature curve. For example, in one embodiment of the invention, the outer tube 106 moves axially with respect to the inner tube 102 through the splined portions 120, 128 in a slip tube spline connection. The outer tube 106 is arranged in an interference fit relationship with the other inner tube 104 through the splined portions 124, 128 in a locked tube spline connection.

Similar to the propeller shaft assembly 10, the slip tube spline connection of the propeller shaft assembly 100 is designed for static and/or dynamic plunge and to provide crash absorption, while the locked tube spline connection does not allow axial movement while the vehicle is driven. By selectively tuning the crash loads for the slip tube spline and locked tube spline connections between the inner tubes 102, 104 and the outer tube 106, the crash signature curve of the propeller shaft assembly 100 can be tuned to optimize the reduction of the probability that the propeller shaft assembly 100 will undesirably buckle in a collision.

For example, the slip tube spline connection between the inner tube 102 and the outer tube 106 can be selectively tuned for crash loads that are between 0 and 10 kN. On the other hand, the locked tube spline connection between the second inner tube 104 and the outer tube 106 is designed to provide a relatively larger crash energy absorption that can be selectively tuned for crash loads that are between 10 and 50 kN. Thus, the amount of energy absorbed during axial deformation of the propeller shaft assembly 100 can be selectively tuned between 0 and 50 kN, thereby allowing the propeller shaft assembly 100 to be selectively tuned different levels of crash energy absorption.

One skilled in the art will appreciate that as with propeller shaft assembly 10, the propeller shaft assembly 100 may also include features such as boot member 40, seal 50, angled end walls of the splines 122, 126, 130, a low-coefficient of friction coating upon the externally projecting splines 122, 126, or a spiral patterns on the splines 122, 126, 130 relative to the rotational axis of the propeller shaft assembly 100. This listing of features is not intended to be exclusive and further features are also contemplated by the present invention.

Because the propeller shaft assembly 10, 100 is thereby permitted to collapse axially and does not buckle significantly (i.e., collapse radially), the vehicle may be in a condition to permit towing or driving of a damaged vehicle which would have otherwise required a trailer to transport the vehicle to a repair facility. More significantly, because the propeller shaft assembly 10, 100 does not buckle, adjacent components remain undamaged after a crash and therefore the damage to the vehicle is reduced.

While the invention has been specifically described in connection with certain specific embodiments thereof, it is to be understood that this is by way of illustration and not of limitation, and the scope of the appended claims should be construed as broadly as the prior art will permit.

What is claimed is:

1. A multiple-tube propeller shaft assembly for transmitting an amount of torque therethrough, comprising:
    a first outer tube having an interior surface with a splined portion;
    a second outer tube having an interior surface with a splined portion; and
    an inner tube having an exterior surface with a splined portion for interconnecting said first and second outer tubes such that said first outer tube transmits substantially all of the torque to said inner tube and said inner tube transmits substantially all of the torque to said second outer tube,
    wherein said splined portion of one of said first and second outer tubes is capable of slidably engaging said splined portion at one end of said inner tube to form a slip spline connection therebetween, and
    wherein said splined portion of the other one of said first and second outer tubes is capable of lockingly engaging said splined portion at the other end of said inner tube to form a locked spline connection therebetween, precluding axial movement until a tunable force is applied.

2. The multiple-tube propeller shaft assembly according to claim 1, wherein the amount of energy absorbed during axial deformation of the propeller shaft assembly can be selectively tuned between 0 and 50 kN.

3. The multiple-tube propeller shaft assembly according to claim 2, wherein said locked spline connection is capable of being tuned to selectively absorb energy between 10 and 50 kN during axial deformation of the propeller shaft assembly.

4. The multiple-tube propeller shaft assembly according to claim 2, wherein said slip tube spline connection is capable of being tuned to selectively absorb energy between 0 and 10 kN during axial deformation of the propeller shaft assembly.

5. The multiple-tube propeller shaft assembly according to claim 1, wherein the inner surface of one of the first and second outer tubes is coated with a material having a low coefficient of friction.

6. The multiple-tube propeller shaft assembly according to claim 5, wherein the material is nylon.

7. The multiple-tube propeller shaft assembly according to claim 1, wherein one of said first and second outer tubes is connected to a universal joint using a Direct Torque Flow (DTF) arrangement.

8. A multiple-tube propeller shaft assembly for transmitting an amount of torque therethrough, comprising:
    a first tube with a plurality of splines defining a splined portion;
    a second tube with a plurality of splines defining a splined portion; and
    a third tube with a plurality of splines defining a splined portion and interconnecting said first and second tubes such that said first tube transmits substantially all of the torque to said third tube and said third tube transmits substantially all torque to said second tube,
    wherein one end of said third tube forms a slip tube spline connection with said splined portion of said first tube, and
    wherein the other end of said third tube forms a locked tube spline connection with said splined portion of said second tube, precluding axial movement until a tunable force is applied.

9. The multiple-tube propeller shaft assembly according to claim 8, wherein said propeller shaft assembly can be selectively tuned to absorb a crash load between 0 and 50 kN.

10. The multiple-tube propeller shaft assembly according to claim 8, wherein said locked spline connection is capable of being tuned to selectively absorb crash energy between 10 and 50 kN during axial deformation of said propeller shaft assembly.

11. The multiple-tube propeller shaft assembly according to claim 8, wherein said slip tube spline connection is capable of being tuned to selectively absorb crash energy between 0 and 10 kN during axial deformation of said propeller shaft assembly.

12. The multiple-tube propeller shaft assembly according to claim 8, wherein an inner surface of one of said tubes is coated with a material having a low coefficient of motion.

13. The multiple-tube propeller shaft assembly according to claim 12, wherein the material is nylon.

14. The multiple-tube propeller shaft assembly according to claim 8, wherein one of said first, second and third tubes is connected to a universal joint using a Direct Torque Flow (DTF) arrangement.

* * * * *